United States Patent [19]

Siebels

[11] 4,144,195

[45] Mar. 13, 1979

[54] HIGH TEMPERATURE RESISTANT, HEAT INSULATING CERAMIC MATERIAL

[75] Inventor: Johann Siebels, Wolfsburg, Fed. Rep. of Germany

[73] Assignee: Volkswagenwerk Aktiengesellschaft, Wolfsburg, Fed. Rep. of Germany

[21] Appl. No.: 780,361

[22] Filed: Mar. 23, 1977

Related U.S. Application Data

[63] Continuation-in-part of Ser. No. 615,492, Sep. 22, 1975, abandoned.

[30] Foreign Application Priority Data

Sep. 24, 1974 [DE] Fed. Rep. of Germany ....... 2445468

[51] Int. Cl.$^2$ ...................... C04B 35/10; C04B 35/00; C04B 35/16; B01J 29/06
[52] U.S. Cl. ............................. 252/455 R; 106/73.4; 106/73.5; 106/65
[58] Field of Search .................. 106/65, 73.4, 73.5; 252/455 R

[56] References Cited

U.S. PATENT DOCUMENTS

| | | | |
|---|---|---|---|
| 3,691,097 | 9/1972 | Stiles et al. | 252/455 R X |
| 3,785,838 | 1/1974 | Weldman | 106/65 X |
| 3,912,658 | 10/1975 | Kaneko et al. | 252/455 R |
| 4,019,914 | 4/1977 | Esper et al. | 106/65 X |

Primary Examiner—Delbert E. Gantz
Assistant Examiner—William G. Wright
Attorney, Agent, or Firm—Spencer & Kaye

[57] ABSTRACT

A high temperature resistant, heat insulating ceramic material comprises a mixture of 30 to 60 volume percent aluminum oxide power and 70 to 40 volume percent alumina-silica fibers sintered together at temperatures between 1200° and 1550° C. so that α-aluminum oxide is present in the sintered material. The ceramic material can be used as a material for hollow bodies which are charged with hot gases, and particularly, for cores of reactors and/or catalytic converters in exhaust gas purification systems of internal combustion engines.

8 Claims, 2 Drawing Figures

4,144,195

HIGH TEMPERATURE RESISTANT, HEAT INSULATING CERAMIC MATERIAL

CROSS-REFERENCE TO RELATED APPLICATION

This application is a continuation-in-part application of copending U.S. application Ser. No. 615,492, filed Sept. 22nd, 1975, now abandoned and hereby incorporated by reference.

BACKGROUND OF THE INVENTION

The present invention relates to a high temperature resistant, heat insulating ceramic material, to the use of such a ceramic material, and to a method for producing a hollow body that can be charged with hot gases, particularly the core of a reactor and/or a catalytic converter for exhaust gas purification systems of internal combustion engines where the core is made of such a ceramic material.

The problem on which the present invention is based is to provide a ceramic material which can be used as core material for the reactors and/or catalytic converters of exhaust gas purification systems where these cores are exposed to the hot exhaust gases of a combustion engine. The ceramic material must have a high temperature resistance and be heat insulating, and, if possible, should be capable of supporting the reactions taking place in such devices. A further requirement for such a ceramic material is that the material should have a relatively high stability in order to be able to withstand the high mechanical stresses occurring during such use.

SUMMARY OF THE INVENTION

In accordance with its purpose and as a solution of the above problem, the present invention, as embodied and broadly described, provides a ceramic material which comprises a mixture of 30 to 60 percent by volume aluminum oxide powder ($Al_2O_3$) and 70 to 40 percent by volume alumina-silica fibers, the mixture being sintered at temperatures between 1200° and 1550° C. for about 10 to 50 hours so that $\alpha$-aluminum oxide is present in the sintered material.

The ceramic material according to the present invention has a relatively high stability and good heat insulating effect and is moreover distinguished by extremely high thermal shock resistance which makes it particularly advantageous for use as a core material for reactors and/or catalytic converters for exhaust gas purification systems in internal combustion engines.

It is to be understood that both the foregoing general description and the following detailed description are exemplary, but are not restrictive of the invention.

BRIEF DESCRIPTION OF THE DRAWINGS

The accompanying drawings, in which like numbers indicate like parts, illustrate examples of presently preferred embodiments of the invention and, together with the description, serve to explain the principles of the invention.

Of the drawings.

DETAILED DESCRIPTION OF THE INVENTION

Figure 1:
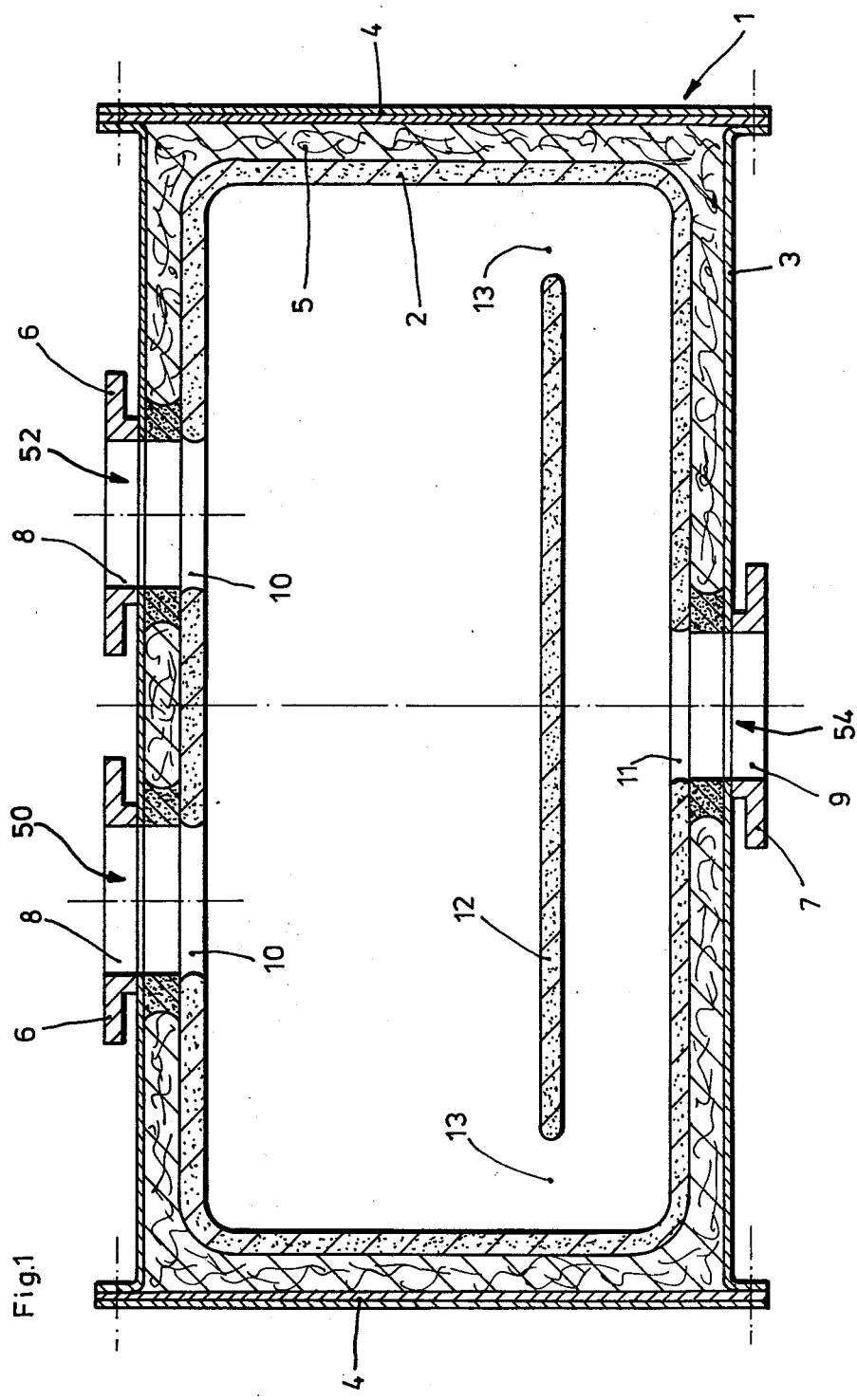
FIG. 1 is a schematic representation of a longitudinal sectional view of a reactor connected in the exhaust gas line of an internal combustion engine and having a core of the ceramic material according to the invention.

In accordance with the present invention, aluminum oxide powder is used as an essential component in the preparation of the ceramic material. The aluminum oxide (alumina) powder generally has a particle size of from about 3 to about 150 microns, and preferably, from about 3 to about 50 microns. The aluminum oxide powder is mixed with alumina-silica fibers which are the second essential component in the preparation of the ceramic material. The alumina-silica fibers generally have a length of from about 0.5 to about 250 mm, preferably 2 to 40 mm and a diameter of from about 1 to about 20 microns, and preferably 1.5 to 10 microns. The aluminum oxide powder in the mixture is present in an amount of from about 30 to about 60 percent by volume, based on the total volume of aluminum oxide powder and alumina-silica fibers in the mixture. The alumina-silica fibers in the mixture are present in an amount of from about 70 to 40 percent by volume, based on the total volume of aluminum oxide powder and alumina-silica fibers in the mixture. The aluminum oxide powder used in the present invention can have, for example, a bulk density of 1.5 g/cc and the alumina-silica fibers can have, for example, a processing density of 0.25 gm/cc. The alumina-silica fibers in the starting mixture can be present in an amount of from about 10 to 28 percent by weight, based on the total weight of aluminum oxide powder and alumina-silica fibers in the mixture. Correspondingly, the aluminum oxide powder in the starting mixture can be present in an amount of from about 72 to 90 percent by weight, based on the total weight of aluminum oxide and alumina-silica fibers in the mixture.

In the present invention, the aluminum oxide is present in the final sintered product as $\alpha$-aluminum oxide. The $\alpha$-aluminum oxide in the final product can result from the use of $\alpha$-aluminum oxide in the starting mixture or from the use in the starting mixture of a less stable form of aluminum oxide which converts to the stable $\alpha$-aluminum oxide during the process conditions of the present invention. Alpha-aluminum oxide is a stable form of aluminum oxide and is formed from less stable forms of aluminum oxide. Alpha-aluminum oxide is stable under the sintering conditions used in the present invention, and accordingly when used in the starting material it is also present in the final product.

In the present invention, the starting material is always to be sintered at about 1200° to 1500° C. for about 10 to 50 hours. At a temperature range beginning at above about 1150° C. and extending to about 1550° C., less stable forms of aluminum oxide will have been transformed or will be transformed at above about 1150° C. to the stable alpha modification under the sintering conditions used in the practice of the present invention. Sintering at temperatures above 1200° C. in accordance with the present invention has the result that practically all the aluminum oxide contained in the ceramic substance of the present invention, unless $\alpha$-aluminum oxide powder has been used from the start, is transferred or converted to the stable alpha modification. Thus, the sintering conditions used in the present invention ensure that less stable forms of aluminum oxide powder are converted to the stable $\alpha$-aluminum oxide form.

Correspondingly, the aluminum oxide powder in the starting mixture can be present as α-aluminum oxide or as any other substance containing or producing less stable aluminum oxides for instance aluminum hydroxides such as Gibbsite, Boehmite or Bayerite.

With the ceramic material of the present invention, it is no longer possible to state percentages in the finished state of the individual components because these components have entered firm bonds which can no longer be separated in the diffusion process during sintering. The volume percent of the components of the starting product indicates the degree of volume occupied in the body of the components. The fiber material, which in its original state is an amorphous silicate glass fiber, is converted under heat to a crystalline form and it is the crystalline form which then determines the structure of the finished ceramic material. This means that the originally employed silicate glass fiber no longer is present as such in the finished ceramic material. The crystalline fibers which determine the structure of the finished product have the same volume as the starting glass fibers but they no longer are glass fibers.

In addition to the aluminum oxide powder and alumina-silica fibers, other components can be present in the mixture. In one preferred embodiment of the invention, the insulating effect and the stability of the ceramic material is increased by adding to the starting mixture of aluminum oxide powder and alumina-silica fibers, a proportion of from 5 to 20 percent by weight zirconium silicate ($ZrSiO_4$), based on the total weight of aluminum oxide powder and alumina-silica fibers.

In a further embodiment of the present invention, catalytically effective additives are added to the starting mixture. These catalytically effective additives may include from about 1 to about 10 percent by weight, based on the total weight of aluminum oxide powder and alumina-silica fibers, of one or a plurality of the elements of the group of titanium, vanadium, chromium, manganese, iron, cobalt, nickel or copper, one or a plurality of oxides of these elements or other compounds of these elements. These other compounds can be phosphates such as iron or aluminum phosphate or other metallic salts or compounds of the metallic elements one with another as for instance the nickel-copper compound Monel metal. The catalytically effective additive can also be in the form of an element of the rare earths or a noble metal from the platinum group, preferably in an amount of from 0.05 up to 3 percent by weight, based on the total weight of aluminum oxide powder and alumina-silica fibers. The advantage of adding these catalytically effective additives to the ceramic material is that they enhance the reactions which take place in the reactors and catalytic converters, and especially contribute to an early starting of these reactions. In particular, the group of the non-noble catalysts, such as nickel, nickel oxide, copper, copper oxide, chromium oxide, iron oxide, manganese oxide, titanium oxide and others have a further great advantage in combination with the oxide ceramic sinter materials. These non-noble catalysts can be used as sintering aids as well as for setting some significant material properties.

The material properties to be influenced by adding the non-noble catalysts are for instance strength, thermal expansion, erosion resistance, thermal conductivity, porosity and chemical stability. The ways of setting those properties are well known and described in various technical literature such as G. M. Biggar: "Phase Equilibria in Chrome-Bearing Basic Refractories", The Refractory Journal, No. 1, 1972, pages 6 to 9. $TiO_2$, $Cu_2O$ and $MnO$ increase the coefficient of diffusion for $Al_2O_3$ and effect a higher sintering velocity. High sintering velocity often means an increased graingrowth. To avoid this with respect to advantageous mechanical properties additives like CuO, MgO and NiO are used. $Cr_2O_3$ is a good additive for getting high erosion resistance and in some cases for stabilizing the alumina fiber against fluidizers and also for increasing the thermal shock resistance. The total amount of additives that can be present is about 1 to 60 percent by weight, based on the total weight of aluminum oxide powder and alumina-silica fibers, where the maximum amount is given by the wanted degree of high temperature resistance and the desired mechanical properties. Good results for various applications were received with typical total amounts of additives up to 30 percent by weight, based on the total weight of aluminum oxide powder and alumina-silica fibers. At higher amounts the thermal and mechanical characteristics became less acceptable.

An important feature of the present invention is the use of the high temperature resistant, heat insulating ceramic material according to the invention as the material for hollow bodies, and particularly, as the material for the cores of reactors and/or catalytic converters in exhaust gas purification systems of internal combustion engines where such hollow bodies are charged with hot gases.

In order to produce such a hollow body of a high temperature resistant, heat insulating ceramic material, the present invention further provides a method of making a hollow body which comprises mixing the mixture of 30 to 60 volume percent aluminum oxide powder ($Al_2O_3$) and 70 to 40 volume percent alumina-silica fibers with a glue or binder to form a shapeable mass, molding the mass into a raw hollow body in a mold, and sintering the raw hollow body in a furnace at temperatures between about 1200° to about 1550° C. for about 10 to 50 hours to produce a finished hollow body. Suitable binders are for instance silicate binders and organic binders or glues like sugar (glucose), starch and thermoplastics.

The starting behavior of such reactors and catalytic converters can be increased by applying a catalytically effective layer to the interior surfaces of the hollow body before or after the sintering process, in addition to, or instead of, intimately mixing the catalytically effective additives with the sinterable mixture of aluminum oxide powder and alumina-silica fiber. This layer can comprise one or a plurality of elements of the group titanium, vanadium, chromium, manganese, iron, cobalt, nickel, or copper, one of a plurality of oxides of these elements or other compounds of these elements, as well as an element of the rare earths, or a noble metal of the platinum group. In all cases, this catalytically effective layer or coating has the result that the starting behavior of a reactor or catalytic converter produced according to the present invention is very good and the reaction taking place in these hollow bodies can be maintained at optimum levels so that the contaminating components contained in the exhaust gases of an internal combustion engine can be eliminated.

Examples for the use of the ceramic material according to the present invention as a core material for reactors and catalytic converters in exhaust gas purification systems of internal combustion engines are illustrated in the drawings and will now be explained in detail with reference to the drawings.

Referring to FIG. 1, there is shown a reactor 1 which is connected in the exhaust gas line of an internal combustion engine, particularly of a motor vehicle, near the engine. Reactor 1 has a rectangular cross section and has a core 2 made of the ceramic material of the present invention. Core 2 is force-fittingly held in an outer housing 3 made of a metallic material and closed at its frontal faces by two covers 4. The connection between housing 3 and core 2 is effected by means of an elastic insulating layer 5 under pressure made, for example, of an alumina-silica fiber material.

Reactor 1 contains two inlets, generally 50 and 52, through which the exhaust gas coming from the internal combustion engine enters, and an outlet, generally 54, for the passage of the combustion gases. Outer housing 3 has a flange 6 for each inlet and a flange 7 for the outlet. Flanges 6 and 7 have passage bores 8 and 9, respectively, corresponding to like openings 10 and 11 in reactor core 2. In order to increase the period of dwell of the exhaust gases in reactor core 2, a transverse bar 12 is provided in front of outlet opening 11. Transverse bar 12 forms lateral openings 13 on opposite sides of reactor 1 and forces the exhaust gases to flow around bar 12 through lateral openings 13 of the reactor chamber to outlet opening 11.

Reactor core 2 shown in the drawing is manufactured of two half shells, each of which was individually molded in a polystyrene foam mold from a mixture of 50 volume percent α-aluminum oxide powder ($Al_2O_3$) having a bulk density of 1.5 gm/cc and 50 volume percent of medium length alumina-silica fibers having a processing density of 0.25 gm/cc and sold under the name Fiberfrax, the mixture being in the form of a moldable mass to which a binder had been mixed. The raw, shaped molded half shells were dried in an air circulating furnace, and then the inner surfaces of the half shells, in particular, were coated, for the purpose of making them smoother and also to activate them, with a fine-grained aqueous slurry of $Al_2O_3$ powder with 5 weight percent $Cr_2O_3$ and 2 weight percent of a compound of cobalt, molybdenum, chromium and silicon. The inner coating was dried and, after drying, the two half shells then were attached together with a mortar or binder and sintered for 10 hours in a furnace at 1350° C. The compound contains 62% Co, 28% Mo, 8% Cr and 2% Si. The mortar or binder can be a clay of 80% $SiO_2$, 10% $Al_2O_3$ plus impurities or the base material with about 2 to 10% water-glass or other fluidizers or any other refractory material such as clay, cement or wash with high amounts of fluidizers.

The ceramic hollow body produced in this way has a relatively good stability and good heat insulating properties as well as an extremely high resistance to thermal shock. The coating, applied in particular to the inside of the hollow body acts, inter alia, as an activator which supports and stimulates the thermal conversion reaction of the contaminants contained in the exhaust gases.

Figure 2:
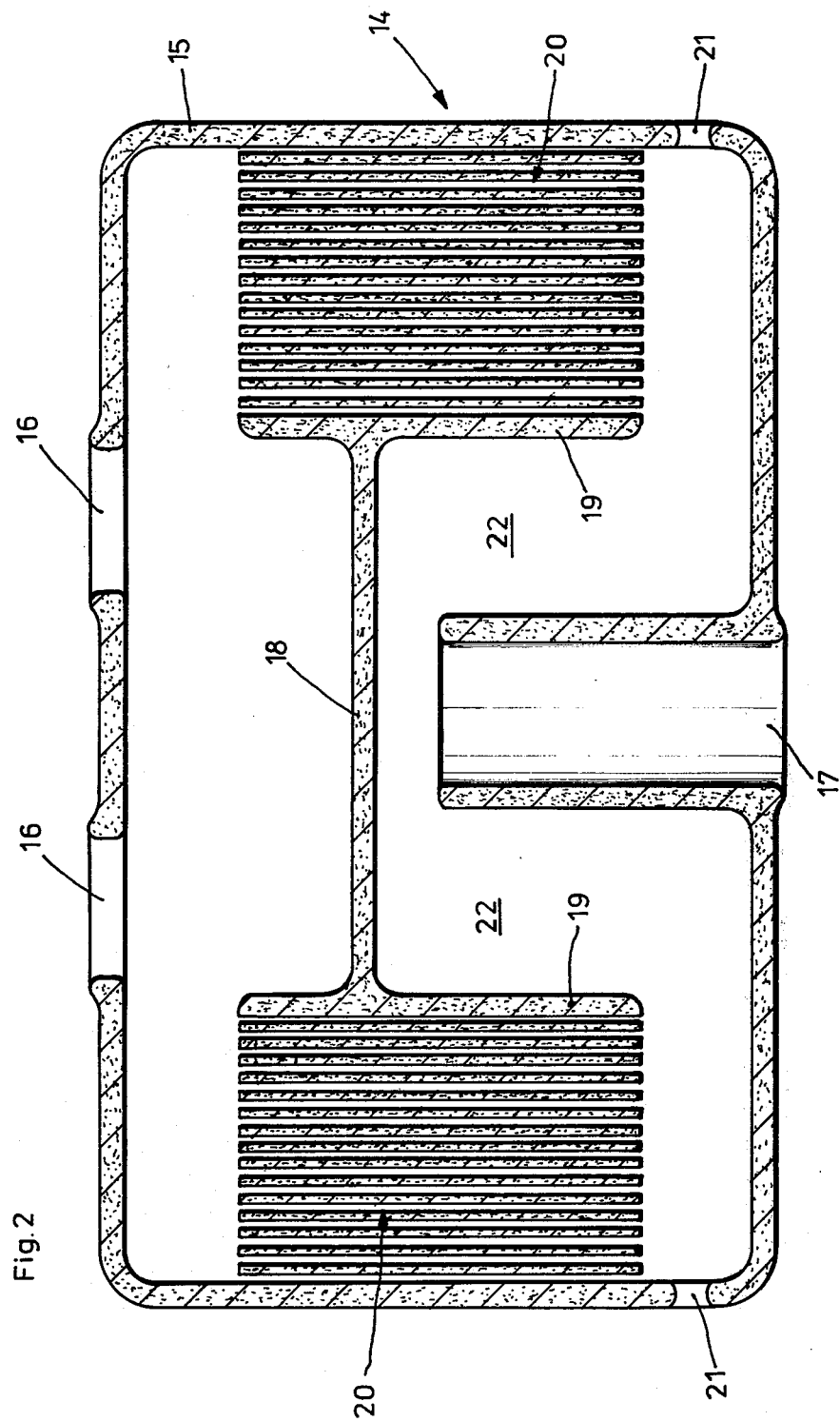
FIG. 2 is a schematic representation of a longitudinal sectional view of a hollow body of the ceramic material according to the invention which contains a catalytic converter as well as a thermal reactor.

FIG. 2 shows a hollow body 14 produced from the ceramic material according to the invention which, in addition to having a part with a catalytic converter, also has a part with a thermal reactor. Hollow body 14 contains an outer wall 15 which has two inlet openings 16 through which the exhaust gas coming from the internal combustion engine enters, and an outlet opening 17. A partition 18 divides the core and changes at its end to transverse bars 19 which enclose reduction zones 20 between themselves and the frontal faces of the housing. These reduction zones 20 may include individual, spaced, sheet-like segments coated with a catalytically effective layer, for example, a non-noble metal catalyst, such as nickel, or a noble metal catalyst, such as platinum. Instead of the sheet-like segments, a separately fabricated monolithic carrier can be used which is also provided with a known catalytically effective layer.

Directly behind the reduction zones 20, hollow body 14 is provided with smaller entrance apertures 21 for a secondary air intake. This secondary air produces a thermal reaction in the reactor chamber 22 remaining between reduction zones 20 and housing outlet 17 where the remaining still uncombusted components of the exhaust gases are oxidized.

The hollow body shown in FIG. 2 may be made of the same material and according to the same process as the reactor core shown in FIG. 1.

A further example for the material of the present invention will now be given. In this case, the basic mass consists of a mixture of 50 volume percent medium length alumina-silica fiber material having a processing density of 0.25 gm/cc and sold under the tradename Fiberfrax, 40 volume percent α-aluminum oxide powder ($Al_2O_3$) having a bulk density of 1.5 gm/cc, 8 volume percent manganese oxide and 2 volume percent silcon oxide ($SiO_2$), all stirred together with a binder or glue. The hollow body is provided at its interior surface, and particularly in the region of the reduction zone 20 and in the region of the thermal reaction chamber 22, with a catalytically effective layer which may be a noble metal catalyst applied after firing or a non-noble metal catalyst applied before firing. Thus, it is possible to apply before firing a coating of an aqueous slurry which, in addition to the active catalytic materials contained in the basic hollow body, contains additives of from 5 to 10 percent by weight each of manganese oxide, copper oxide, iron oxide, chromium oxide and a compound of cobalt, molybdenum, silicon and chromium.

There now follows a list of various compounds that can be present as additives in the basic material of the core body as well as in the aqueous slurry:
1. 55% Co, 35% Mo, 10% Si;
2. 62% Co, 28% Mo, 8% Cr, 2% Si;
3. 52% Co, 28% Mo, 17% Cr, 3% Si;
4. 32% Mo, 15% Cr, 50% Ni, 3% Si;
5. 50% of the compound 1. 50% S-Monel metal;
6. 50% of the compound 1. 50% Cu;
7. 50% of the compound 1. 25% Cu, 25% Ni;
8. 50% of the compound 1. 50% Ni;
9. 80% of the compound 2. 20% Ni.

It will be understood that the above description of the present invention is susceptible to various modifications, changes and adaptations, and the same are intended to be comprehended within the meaning and range of equivalents of the appended claims.

What is claimed is:

1. A high temperature resistant, heat insulating, sintered, ceramic material formed from a starting mixture comprising a mixture of 30 to 60 volume percent aluminum oxide powder ($Al_2O_3$) and 70 to 40 volume percent alumina-silica fibers, based on the total volume of aluminum oxide powder and alumina-silica fibers, the alumina-silica fibers in the starting mixture being present in an amount of from about 10 to 28 percent by weight, based on the total weight of aluminum oxide powder and alumina-silica, said powder and fibers being sintered together at temperatures between about 1200° and about 1550° C. for about 10 to 50 hours so that α-aluminum oxide is present in the sintered material.

2. The ceramic material as defined in claim 1 wherein the mixture contains a proportion of from about 5 to about 20 weight percent zirconium silicate ($ZrSiO_4$), based on the total weight of aluminum oxide powder and alumina-silica fibers.

3. The ceramic material as defined in claim 1 wherein the mixture contains at least one catalytically effective additive.

4. The ceramic material as defined in claim 3 wherein the mixture contains a catalytically effective additive of from about 1 to about 10 percent by weight, based on the total weight of aluminum oxide powder and alumina-silica fibers, of at least one of the elements titanium, vanadium, chromium, manganese, iron, cobalt, nickel or copper, or at least one oxide or other compound of these elements.

5. Ceramic material as defined in claim 3 wherein the mixture contains up to 3 weight percent of an element of the rare earths, based on the total weight of aluminum oxide powder and alumina-silica fibers.

6. Ceramic material as defined in claim 3 wherein the mixture contains up to 3 percent by weight of a noble metal of the platinum group, based on the total weight of aluminum oxide powder and alumina-silica fibers.

7. The ceramic material as defined in claim 1 wherein the alumina-silica fibers in the starting mixture have a processing density of about 0.25 gm/cm$^3$ and the aluminum oxide powder has a bulk density of about 1.5 gm/cm$^3$.

8. The ceramic material as defined in claim 1 wherein the alumina-silica fibers are amorphous silicate glass fibers in the starting mixture and are in a crystalline form in the sintered material.

* * * * *